2,967,893
Patented Jan. 10, 1961

2,967,893

HYDROGENATION OF 2-BUTYNE-1,4-DIOL TO 1,4-BUTANEDIOL

Eugene V. Hort and David E. Graham, Westfield, N.J., assignors to General Aniline & Film Corporation, New York, N.Y., a corporation of Delaware No Drawing. Filed Dec. 30, 1958, Ser. No. 783,717

9 Claims. (Cl. 260—635)

This invention relates to the catalytic hydrogenation of 2-butyne-1,4-diol, hereinafter referred to as butynediol, to 1,4-butanediol, hereinafter referred to as butanediol, and more particularly to the production of a butanediol having a relatively low carbonyl number.

The hydrogenation of butynediol to butanediol in the presence of a number of different catalysts and by a number of different procedures is known. However, such previously proposed processes have been deficient for a number of reasons, including the production of butanediol in relatively lower yields and/or lower quality, the necessity for using specially prepared or poisoned catalysts, high pressures, careful control to avoid production of undesirable by-products and/or the like. A nickel catalyst has been successfully employed in such a process, but this process likewise requires the use of very high pressures of the order of 200 or more atmospheres.

Because of lower equipment, maintenance and operation costs, a low pressure process has an intrinsic advantage over a high pressure process. However, unless excessively long hydrogenation times or an excessive amount of catalyst is used, the butanediol produced at low pressure tends to be cruder than desired. Purification by distillation is difficult. Two competing reactions proceed during hydrogenation. The principal reaction is the stepwise hydrogenation of butynediol to butenediol to butanediol. The second reaction, minor at low temperatures, is the isomerization of butynediol or butenediol to a carbonyl compound. This carbonyl compound, mainly gamma-hydroxybutyraldehyde, is much slower to hydrogenate than the carbon-carbon double or triple bond and normally remains to contaminate the product, giving it an unduly high carbonyl number.

For many commercial purposes, butanediol having a relatively low carbonyl number, for example 3.5 or lower, is required, although for some purposes higher carbonyl numbers of up to 10 or more may be tolerated. The carbonyl number is determined by reacting the impure butanediol with an excess of hydroxylamine hydrochloride. Any aldehyde or ketone forms an oxime and liberates hydrochloric acid. The hydrochloric acid liberated is potentiometrically titrated with standard alkali and the carbonyl number reported as mg. KOH required to restore pH per g. of sample used.

It is an object of this invention to provide a hydrogenation process for the reduction of butynediol to butanediol which will not be subject to the above disadvantages. Another object of this invention is the provision of a process for the hydrogenation of butynediol to butanediol in the presence of a nickel catalyst at relatively low temperatures and pressures. Still another object of this invention is the provision of such a process productive of good yields of the desired butanediol without simultaneous production of substantial amounts of undesirable by-products which would reduce the quality and yield of products desired. A further object of this invention is the provision of such a process productive of a butanediol having a low carbonyl number. Other objects and advantages will appear as the description proceeds.

The attainment of the above objects is made possible by the instant inventive process for the catalytic hydrogenation of 2-butyne-1,4-diol to 1,4-butanediol comprising treating a mixture containing a nickel catalyst and 2-butyne-1,4-diol in liquid form with hydrogen, at a pressure of about 0 to 20 atmospheres gauge and a temperature of about 20° to 80° C. until substantially no more hydrogen is being absorbed, and then raising the temperature of the mixture at least 25° C. and within the range of about 80° to 140° C. and continuing the treatment of the mixture with hydrogen until the carbonyl number of the 1,4-butanediol product has been reduced to the desired value. It has been found that the present process enables the attainment of a butanediol having a relatively low carbonyl number in addition to large savings in cost of operation and equipment because of the relatively low pressures which may be employed. An additional advantage resides in the relatively rapid completion of the process for the production of the desired high yields of pure butanediol.

In carrying out the process of this invention, the butynediol is maintained in liquid condition, which may be achieved by use of substantially pure butynediol at a temperature above its melting point (57.5° C. at atmospheric pressure), or by use of a solution of the butynediol in an inert organic solvent such as a monohydric alcohol, for example, ethyl, isopropyl, butyl, or amyl alcohol, dioxane, or a glycol such as ethylene glycol, propylene glycol, hexanediol or butanediol. The use of butanediol as a solvent is advantageous in that a unitary product is obtained by hydrogenation of the dissolved butynediol. It is preferred, however, to employ an aqueous solution of butynediol, commercially available in a concentration of about 35% by weight. The concentration of the butynediol in either the organic solvent or in aqueous solution may range from about 20% or less up to about 99%. The commercially available aqueous solutions have a pH of about 4 to 6 and may be so employed in the present process without adjustment of the pH. For optimum results, it is, however, preferred to carry out the present hydrogenation process in the alkaline pH range, which would require addition to the acidic solution of a suitable amount of a base such as sodium or potassium hydroxide or other basic substances. The use of such an alkaline medium in a process for hydrogenating butynediol to butanediol is disclosed and claimed in the copending application of Hort, Serial No. 706,251, filed December 31, 1957.

The nickel catalyst employed in the process of this invention is preferably maintained in the liquid butynediol reaction medium in finely divided form. A Raney-type nickel catalyst (such catalysts are described in U.S. Patent No. 1,638,190) is preferred as yielding optimum results. This type of catalyst is readily prepared by treating an aluminum-nickel alloy with caustic soda to dissolve out the aluminum and leave the nickel in a highly divided and particularly effective form. The amount of nickel catalyst employed will generally range from about 0.1 to 10%, and preferably from about 0.5 to 3% by weight of the butynediol, but such amount is not critical since the catalyst is not deactivated during the hydrogenation and may be reused. For a given amount of butynediol to be hydrogenated, the rate of hydrogenation will vary directly with the amount of catalyst employed.

In accordance with the instant process, further improved results and advantages are obtained when the nickel catalyst contains dispersed thereon about 3 to 25% of copper by weight of the nickel catalyst, preferably as deposited from a soluble or dispersible copper compound. A water soluble copper compound is preferably added to the aqueous butynediol-nickel catalyst system, particularly the copper salts of strong acids such as copper sulfate, copper chloride, and copper nitrate, and the copper salts of weak acids such as copper cyanide, copper formate, copper acetate and copper carbonate. Copper oxide may also be used. The nickel replaces the copper from the solution and any residual soluble copper is reduced during the hydrogenation. The precipitated copper is dispersed or coated on the nickel catalyst.

The concurrent use of copper in the above defined process has little or no effect on the activity of the nickel catalyst for hydrogenation but acts to increase yields and suppress isomerization during the process which would tend to produce by-products having a detrimental effect upon the quality and yield of the desired butanediol. The catalyst maintains its activity much longer, possibly because of the lowering of the formation of by-products, including gamma-hydroxybutyraldehyde, tetrahydrofurane, dihydrofurane, propionaldehyde, and the like, and the poisoning produced thereby, and may accordingly be reused repeatedly.

The hydrogenation of the butynediol in the reaction medium is carried out by maintaining an atmosphere of hydrogen over the surface thereof, contact therewith being facilitated by agitation as by rocking or shaking the reaction vessel, or by stirring the reaction medium with a high speed propeller or the like. The first stage of the present process is carried out at a relatively low pressure of about 0 to 20, preferably about 5 atmospheres gauge, and a temperature of about 20 to 80° C., preferably about 50° C., the treatment with hydrogen being continued until substantially all of the butynediol has been hydrogenated to butanediol. The completion of this first stage is indicated by a relatively rapid drop in the rate of absorption of hydrogen, although a small amount of hydrogen may thereafter continue to be absorbed. At the end of this stage, the reaction mixture contains no butynediol and a small amount of butenediol, i.e. 2% more or less. By carrying out this first stage of the process in the described manner, a minimum amount of isomerization to carbonyl compounds takes place, although such amount is still too high for ordinary commerical use. It will of course be understood that the duration of this first stage of the process will be dependent upon the temperature, pressure, quantities of reactants, and the like, and may range from 1 hour or less up to 10 or more hours.

Following completion of the first stage of the process, and while the pressure is maintained within the above mentioned range, the temperature of the reaction mixture is raised at least 25° C. and within the range of about 80 to 140° C., preferably about 120° C., and the treatment with hydrogen continued whereby reduction of the carbonyl compounds in the mixture is facilitated and a butanediol product obtained having a lower carbonyl number than that of the butanediol produced upon completion of the first stage of the process. The second stage hydrogenation is continued until the butanediol resulting from the reaction has the desired carbonyl number preferably about 3.5 to as little as 0.5 or less, although a product having any desired carbonyl number below that of the first stage butanediol may be obtained by suitable shortening of the second stage hydrogenation treatment. Accordingly, the duration of the second stage hydrogenation may range from about ½ hour or less to 8 hours or more, although durations of 2 to 3 hours are usually sufficient to produce specification grade butanediol having a carbonyl number of 3.5 or less. During the second stage, the carbonyl compounds are for the most part reduced to butanol.

By the above process, extremely high yields of pure butanediol of low carbonyl number may be obtained in a relatively short period of time, which butanediol may be easily and quickly separated from the reaction mixture by filtering off the suspended material and subjecting the filtrate to a flash distillation or very rudimentary fractionation, in known manner. By way of example, the reaction mixture resulting from the second stage of the process may be heated at atmospheric pressure and 100° C. or more to remove most of the water. The temperature is gradually raised to 115 to 120° C. and the pressure gradually reduced until no more water distills over after which the butanediol distills over at reduced pressures of 2 to 20 mm. Hg and pot temperatures up to about 200° C. The butanediol thus collected is obtained in high yield and purity, low carbonyl number, and solidification point (S.P.) approaching that of pure butanediol (20.9° C.).

The following examples in which parts are by weight unless otherwise indicated, are only illustrative of the instant invention and are not to be regarded as limitative.

*Example 1*

1458 g. (6.0 moles) of 35.4% aqueous butynediol solution is adjusted to pH 8.7 with sodium hydroxide and a 50% aqueous paste containing 16 g. of Raney nickel catalyst and 8 g. of copper acetate added. The suspension is stirred in a one-gallon autoclave at 40° C. under 75 p.s.i.g. (lbs./square inch. gauge) hydrogen pressure until no further hydrogen is adsorbed. This requires 9 hours.

The suspension is divided into two equal aliquots. One is hydrogenated for 3 more hours at the same pressure and temperature. The other is hydrogenated for 3 hours at the same pressure but at 120° C.

Both aliquots so produced are filtered and distilled rapidly through a six-inch Vigreux column separating aqueous and butanediol product fractions in identical manner.

Product of 40° C. aliquot: 233 g. (86.5%), S.P. 18.2° C., carbonyl number 15 (mg. KOH/g)

Product of 120° C. aliquot: 245 g. (90.5%), S.P. 19.4° C. carbonyl number 2.5 (mg. KOH/g.)

*Example 2*

The procedure of Example 1 is repeated except that the copper acetate is omitted. It requires 12 hours for completion of the first step of the hydrogenation.

Product of 40° C. aliquot: 221 g. (82%), S.P. 18.3° C., carbonyl number 17

Product of 120° C. aliquot: 232 g. (86%), S.P. 19.2° C., carbonyl number 3.5

*Example 3*

The procedure of Example 1 is repeated except that the first stage hydrogenation is carried out at 60° C. and one aliquot is hydrogenated at 100° C. instead of 120° C. The first step requires 5 hours.

Product of 60° C. aliquot: 233 g. (86.5%), S.P. 18.4° C., carbonyl number 14

Product of 100° C. aliquot: 242 g. (89.5%), S.P. 19.3° C., carbonyl number 3

*Example 4*

When the hydrogenation is carried out from beginning to end at a relatively high temperature the yield and quality suffers. Thus, when the first hydrogenation step of Example 1 is repeated but at 100° C., hydrogenation is complete in 2 hours. After holding 3 more hours at 100° C., the run is filtered and distilled as previously described.

Yield: 83.5%, S.P. 17.9° C., carbonyl number 8.95.

*Example 5*

The procedure of Example 1 is repeated except that the pH prior to hydrogenation is 5.5. The hydrogenation is complete in 6 hours (plus 3 hours for the second stage hydrogenation at 120° C.).

Yield: 89%, S.P. 19.2° C., carbonyl number 3.46.

This invention has been disclosed with respect to certain preferred embodiments and various modifications and variations thereof will become obvious to the worker skilled in the art. It is to be understood that such modifications and variations are to be included within the scope and spirit of this invention.

We claim:

1. A process for the catalytic hydrogenation of 2-butyne-1,4-diol to 1,4 butanediol comprising treating a mixture containing a nickel catalyst and 2-butyne-1,4-diol in liquid form with hydrogen, at a pressure of about 0 to 20 atmospheres gauge and a tempearture of about 20 to 80° C. until substantially no more hydrogen is being absorbed, and then raising the temperature of the mixture at least 25° C. and within the range of about 80° to 140° C. and continuing the treatment of the mixture with hydrogen until the carbonyl number of the 1,4-butanediol product has been reduced to the desired value.

2. A process as defined in claim 1 wherein a Raney-type nickel catalyst is employed.

3. A process as defined in claim 2 wherein the catalyst carries about 3 to 25% by weight of copper.

4. A process as defined in claim 1 wherein said mixture has an alkaline pH at the start of said treatment with hydrogen.

5. A process as defined in claim 1 wherein the treatment with hydrogen is carried out at about 50° to 60° C. until substantially no more hydrogen is being absorbed, and subsequently at about 100° to 120° C.

6. A process as defined in claim 5 carried out at a pressure of about 5 atmospheres gauge.

7. A process for the catalytic hydrogenation of 2-butyne-1,4-diol to 1,4-butanediol comprising treating an alkaline mixture containing 2-butyne-1,4-diol in liquid form and a Raney-type nickel catalyst carrying about 3 to 25% by weight of copper with hydrogen, at a pressure of about 0 to 20 atmospheres gauge and a temperature of about 20° to 80° C. until substantially no more hydrogen is being absorbed, and then raising the temperature of the mixture at least 25° C. and within the range of about 80° to 140° C. and continuing the treatment of the mixture with hydrogen until the 1,4-butanediol product has a carbonyl number of no more than about 3.5.

8. A process as defined in claim 7 wherein the first mentioned temperature range is about 50° to 60° C. and the second mentioned temperature range is about 100° to 120° C.

9. A process as defined in claim 8 carried out at a pressure of about 5 atmospheres gauge.

References Cited in the file of this patent

UNITED STATES PATENTS

| 2,319,707 | Reppe et al. | May 18, 1943 |

FOREIGN PATENTS

| 698,019 | Great Britain | Oct. 7, 1953 |